Patented Sept. 27, 1927.

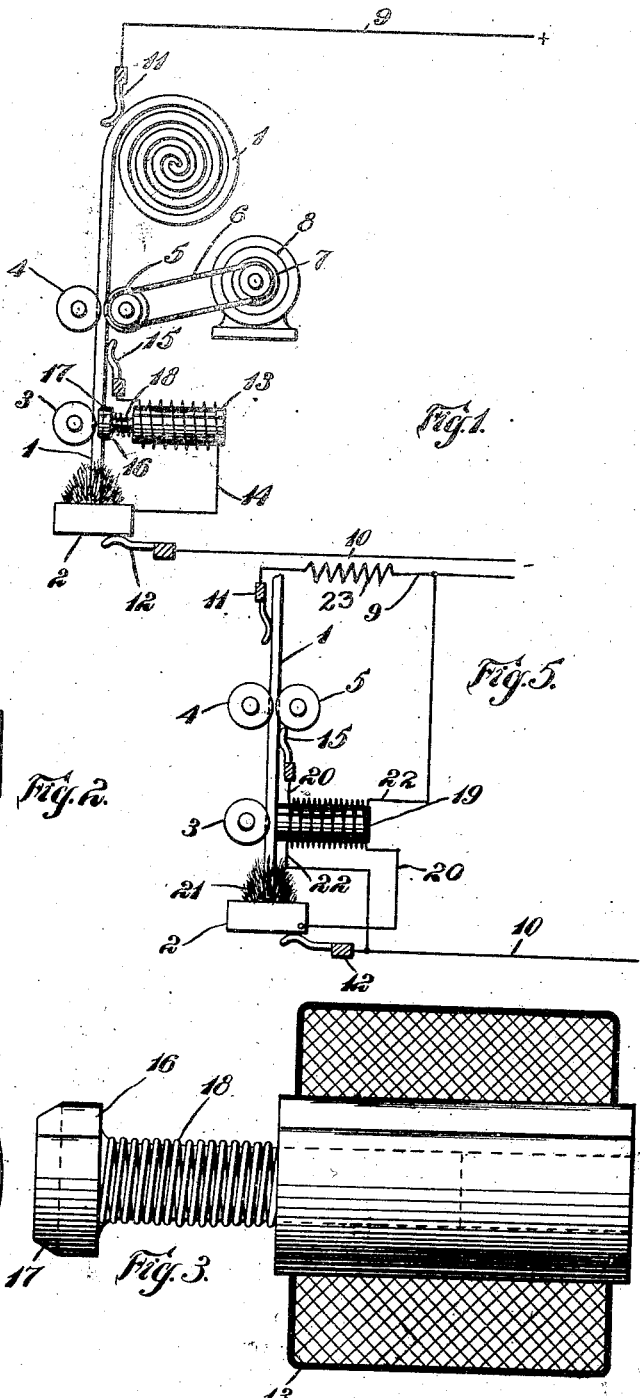

1,643,773

UNITED STATES PATENT OFFICE.

WILLIAM B. JASPERT, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE-FEEDING MEANS.

Application filed June 3, 1921. Serial No. 474,815.

My invention relates to electric arc welding, more especially to a welding mechanism which automatically regulates the feeding of the welding electrodes in relation to the length of the arc, and it is among the objects thereof to provide a control means that shall be positive and efficient in its operation and which provides a uniform length of arc during the welding process.

In a copending application of W. H. Himes, Serial Number 439,914, filed Jan. 26, 1921, for automatic welding machines, patented April 28, 1925, No. 1,535,605, and assigned to the Westinghouse Electric & Manufacturing Company, is described an apparatus for controlling the feeding of an electrode to maintain a constant length of the welding arc that includes a variable-speed, friction-drive mechanism actuated by a solenoid which is connected across the arc.

The variable-speed, friction-drive mechanism and the solenoid-actuated shifting device are relatively complex and take up considerable space, which is undesirable, especially in portable welding systems.

My present invention is intended to more satisfactorily perform the desired functions and includes a solenoid which operates to control the speed of the electrode directly without the use of intermediate shifting members, gears and the like.

In practising my invention, I secure an electrode in operative relation to the work to be welded and utilize a suitable constant speed drive mechanism for feeding the electrode in the direction of the arc at a uniform rate. I further mount a solenoid-actuated friction plunger to engage said electrode to retard its forward movement, when necessary, to provide a uniform arc length. The electrode is connected to a suitable source of welding current and the solenoid that actuates the plunger is connected across the arc.

In the accompanying drawings forming a part hereof, and in which like reference characters designate like parts, Figure I is an elevational view of an electrode-feeding mechanism and control means;

Fig. II is a top plan view of the mechanism for feeding the electrodes;

Fig. III is a side elevational view, partially in section of the controlling solenoid and plunger, Fig. IV is an end view thereof showing the grooved contact surface for engaging an electrode, and Fig. V is an elevational view of an electrode-feeding mechanism having a differentially wound magnet control means.

A straight portion of the electrode 1, which may be a roll of wire, is held in a vertical position above the work 2 to be welded and is supported between the guide rolls 3 and 4 at one side and friction feed wheel 5 and a plunger 16 at the other side. The friction wheel 5 is connected by a belt 6 to a pulley 7 of a motor 8. A speed reduction may be effected by using pulleys of different diameters but the main object of the belt drive is to provide for slippage when the electrode is retarded.

Welding current is supplied to the work through the leads 9 and 10 which are connected to contacts 11 and 12, respectively, said contacts making electrical connections with electrode 1 and work 2, respectively.

A solenoid 13, connected across the arc by the conductors 14 and 15, actuates the plunger 16, having a groove 17 on one face thereof to engage the electrode 1. A spring 18 is secured between the head of the plunger 16 and the solenoid 13, tending to force said plunger against the electrode 1.

In Fig. V a magnet 19 is employed in place of the solenoid 13. The magnet is differentially wound, the winding 20 being left-hand spirally wound and connected across the arc only. The winding 22 is right-hand spirally wound and is connected across the arc and the ballast resistance 23 in series with the arc. When both the left and right-hand windings are energized they counteract each other, tending to effect a balanced relation, thus de-energizing the magnet 19.

My mechanism operates briefly as follows:

The welding current circuit is energized and an arc is produced in the usual manner by striking the electrode against the work and quickly withdrawing the same. The motor 8 is energized to actuate the feed wheel 5, tending to feed the electrode 1 in the direction of the work 2. The plunger 16, engaging the electrode, prevents its downward movement until the potential across the arc increases sufficiently to energize the solenoid 13 which retracts the plunger 16, in opposition to spring 18, to cause the electrode to be released and allow it to advance downward in the direction of the arc.

When the arc length is again normal, the field of the solenoid is so weakened as to gradually release the plunger 16 whereby it may bear against the electrode to gradually retard its speed. The solenoid 13 is so wound as to become energized in proportion to the variation of the arc potential and tends to effect a balanced relation between the position of the electrode and the length of the arc.

In the arrangement shown in Fig. V the magnet 19 becomes energized through the winding 22, causing the electrode 1 to be attracted and its forward movement retarded. It is obvious that, as the winding 22 is connected across the arc and the ballast resistance, it is substantially constantly energized. As the potential across the arc 21 increases, due to the increase in the length of arc or the fusing away of the electrode, the winding 20 becomes energized, tending to set up a counter electromagnetic force. When this is of such magnitude as to neutralize the magnetic force acting on the electrode 1 it will be advanced in the direction of the arc by the friction-feed mechanism.

It will be readily seen from the above description of my invention that this system for automatic feed control is an improvement over the prior art in that it provides a positive and direct means for maintaining a uniform arc length. Such an apparatus is very simple to construct and, because of its simplicity in operation, requires practically no attention from the operator.

Although I have described a specific embodiment of my invention, it will be obvious to those skilled in the art that various modifications may be made in the construction of the apparatus employed without departing from the principles herein set forth. Changes may be made in the feeding mechanism by providing friction drives of suitable types to allow slippage between the feeding wheel engaging the electrode and the source of power.

I claim as my invention:—

1. A welding system comprising a fusible electrode, means for feeding said electrode, a friction brake plunger for retarding the feeding of the electrode, and a solenoid adapted to actuate said plunger, said solenoid being electrically connected across the welding arc.

2. A welding system comprising a fusible electrode, means for feeding said electrode, a friction brake plunger for retarding the feeding of the electrode and electroresponsive means for automatically actuating said plunger in inverse relation to the length of the welding arc.

3. In an automatic welding machine, a fusible electrode, a plurality of guide rolls and a grooved feed wheel engaging said electrode, a constant-speed, friction-drive mechanism for actuating said feed wheel, a plunger engaging said electrode, a coil spring adapted to press said plunger against said electrode and a solenoid adapted to retract said plunger.

4. In an automatic welding machine, a fusible electrode, a plurality of guide rolls and a grooved feed wheel engaging said electrode, a constant-speed friction-drive mechanism for actuating said feed wheel, a grooved plunger engaging said electrode, a coil spring adapted to press said plunger against said electrode and a solenoid adapted to retract said plunger.

5. An electric-arc welding system comprising a fusible electrode, driving means for feeding said electrode toward the arc, the rate of feeding of the electrode being dependent upon the load on said driving means, and controllable means for imposing a variable load on said driving means in addition to the work normally required to feed the electrode.

6. An electric-arc welding system comprising a fusible electrode, driving means for feeding said electrode toward the arc, the rate of feeding of the electrode being dependent upon the load on said driving means, controllable means for imposing a variable load on said driving means in addition to the work normally required to feed the electrode, and means responsive to electrical conditions in the arc for automatically varying said controllable means.

In testimony whereof, I have hereunto subscribed my name this 27th day of May, 1921.

WILLIAM B. JASPERT.